United States Patent
Kemmerer et al.

(10) Patent No.: US 6,871,703 B2
(45) Date of Patent: Mar. 29, 2005

(54) METHOD AND DEVICE FOR CONTROLLING THE OPERATING TEMPERATURE OF A HYDRAULIC OPERATING MEDIUM OF A DRIVE UNIT OF A VEHICLE

(75) Inventors: Benjamin Kemmerer, Unterensingen (DE); Albrecht Schaefer, Uhingen (DE); Dittmar Wieland, Oppenweiler (DE)

(73) Assignee: DaimlerChrysler AG, Stuttgart (DE)

( * ) Notice: Subject to any disclaimer, the term of this patent is extended or adjusted under 35 U.S.C. 154(b) by 229 days.

(21) Appl. No.: 10/303,101

(22) Filed: Nov. 23, 2002

(65) Prior Publication Data

US 2003/0098147 A1 May 29, 2003

(30) Foreign Application Priority Data

Nov. 24, 2001 (DE) .......................................... 101 57 714

(51) Int. Cl.[7] .............................................. G05D 23/02
(52) U.S. Cl. ...................................... 165/297; 165/103
(58) Field of Search ................................ 165/297, 298, 165/280, 103; 236/34.5

(56) References Cited

U.S. PATENT DOCUMENTS

| | | | | |
|---|---|---|---|---|
| 4,393,921 A | * | 7/1983 | Zbinden ..................... | 165/295 |
| 4,454,983 A | * | 6/1984 | Tarvis, Jr. .................. | 236/93 A |
| 4,874,010 A | * | 10/1989 | DeJong et al. .............. | 165/284 |
| 4,899,547 A | * | 2/1990 | Irwin ............................ | 62/63 |
| 4,967,552 A | * | 11/1990 | Kumata et al. ............... | 60/806 |
| 5,253,701 A | * | 10/1993 | Leidinger .................... | 165/299 |
| 5,277,028 A | * | 1/1994 | Worner et al. ................ | 60/468 |
| 5,404,842 A | * | 4/1995 | Matsushiro et al. ....... | 123/41.13 |
| RE35,040 E | * | 9/1995 | DuBois ...................... | 236/92 C |
| 6,178,928 B1 | * | 1/2001 | Corriveau ................. | 123/41.12 |
| 6,260,367 B1 | * | 7/2001 | Furuya et al. ................ | 62/197 |
| 6,418,887 B1 | * | 7/2002 | Okamoto .................. | 123/41.33 |

FOREIGN PATENT DOCUMENTS

| | | |
|---|---|---|
| DE | 2 250 335 | 5/1973 |
| DE | 34 03 435 | 8/1984 |
| DE | 195 12 783 | 10/1992 |
| DE | 32 01 443 | 5/1995 |
| DE | 195 12 783 | 10/1996 |
| DE | 197 56 180 | 6/1999 |
| DE | 199 02 615 | 7/2000 |
| DE | 199 02 408 | 8/2000 |
| DE | 100 30 838 | 1/2001 |
| DE | 199 42 727 | 3/2001 |
| DE | 100 42 749 | 4/2001 |
| DE | 199 43 004 | 4/2001 |
| DE | 198 55 321 | 6/2001 |
| DE | 100 19 029 | 10/2001 |
| EP | 0 787 929 | 8/1997 |
| JP | 10 176748 | 6/1998 |

* cited by examiner

*Primary Examiner*—Teresa J. Walberg
(74) *Attorney, Agent, or Firm*—Klaus J. Bach

(57) ABSTRACT

In a method for controlling the operating temperature of a hydraulic operating medium for a drive unit of a vehicle in a selected range, the operating temperature is controlled by controlling the volume flow of the operating medium for a heat exchange between the operating medium and a secondary heat transfer medium flow medium to a predetermined desired value as a function of the actual value of the operating temperature and as a function of at least one other vehicle parameter, by which a certain temperature influencing effect on the operating medium can be provided. The selected range of the operating temperature includes both the temperature values occurring in the warm-up phase of the drive unit and temperature values, which are substantially higher than the desired value.

18 Claims, 3 Drawing Sheets

METHOD AND DEVICE FOR CONTROLLING THE OPERATING TEMPERATURE OF A HYDRAULIC OPERATING MEDIUM OF A DRIVE UNIT OF A VEHICLE

BACKGROUND OF THE INVENTION

The present invention relates to a method of controlling the operating temperature of a hydraulic operating medium of a drive unit of a vehicle by controlling the volume flow of the operating medium through a heat exchanger and to a control device for performing the method.

DE 195 12 783 A1 discloses a method and a device for controlling the transmission oil temperature in motor vehicles, including a cooling device for cooling the transmission oil, a heating device for heating the transmission oil and a valve which directs the transmission oil through the heating device in a first operating state and through the cooling device in a second operating state. According to the patent, the known method is to be improved in such a manner, that the transmission oil temperature is controlled as a function of vehicle parameters which have an effect on the transmission oil temperature. For this purpose, the first operating state is established in a warm-up phase and, after the warm-up phase, the transmission temperature is regulated to a predetermined desired value in a third operating state by a mixed operation of the first and second operating states. In this known method, the selected range of the operating temperature for setting the latter to the desired value accordingly does not begin until after the warm-up phase. Both operating states are based on the operation of the internal combustion engine, particularly after a cold start, and also on the transmission, particularly on the reaching of a minimum transmission oil temperature. Control may also be based on the idling mode of the internal combustion engine, since, during a prolonged idling, the transmission oil temperature may drop below the predetermined desired value. Also, in this case, the first operating state of the electrically controllable valve, in which the valve directs the volume flow of oil through the heating device, is considered to be advantageous. The above-mentioned valve, the functioning of which is disclosed by DE 43 24 178 A1, has a valve actuating unit in the form of a temperature-responsive expandable element which is encased by a heating coil and is arranged in a valve chamber through which the transmission oil flows. The temperature responsive element and is exposed to by the transmission oil. The transmission oil can be heated via an electric power supply line, which is connected to an electronic control unit. The control unit has a plurality of inputs by means of which, for example, the following signals can be passed on as information to the control unit: the transmission oil temperature, the output rotational speed of the transmission, the rotational speed of the internal combustion engine or the difference between these rotational speeds, a load signal of the internal combustion engine, the selected gear, the activated gear change program for an automatic changing of gears, the switching-on signal of the converter lockup clutch and/or the ascertained type of driver in the case of an adaptive gear change program. The parameters, which are merely specified in the form of an exemplary selection, are intended to be used for activating the electrically controllable valve for setting the volume flow of oil in one or both heat exchangers (heating device and cooling device).

This known method and the associated device for carrying out the known method are costly and complicated because three operating states have to be controlled. A heating device, a cooling device and special functions of the control valve are required, which have to be activated by the temperature-sensitive expandable element and which furthermore must be heated for the activation. Moreover, it is not expedient in many applications to control the oil temperature exclusively by a mixed heating and cooling operation.

DE 199 02 615 A1 discloses a hydraulic system, for an infinitely variable automatic transmission of a motor vehicle, having a variator, which has a first pair of conical discs arranged on the drive side and a second pair of conical discs arranged on the output side. A belt element extends around the first and second pairs of conical discs. Each pair has a primary disc, which can be displaced in a controlled manner in the axial direction via a hydraulic control unit, which has electromagnetic actuators and hydraulic valves. The actuators are controlled by an electronic control unit. A cooler for the oil is arranged in the lubricating/cooling circuit of the hydraulic system and a line leads therefrom to the oil sump. It has been established that, during full load operation, in such transmissions the available amount of oil flowing through the cooler by way of fixed orifices is not sufficient in order to completely dissipate the heat via the cooler. Furthermore, the amount of oil flowing through the cooler may be restricted by the fact that, with regard to the cooling-induced discharge of oil from the region of the converter clutch, the power transmission capability of the latter still has to be sufficient for the customary driving maneuvers taking into consideration the maximum requirement in terms of volume for adjusting the primary disc and the secondary disc of the variator. In order also to ensure sufficient cooling of the oil while ensuring the power transmission capability of the converter clutch in the case of infinitely variable automatic transmissions of this type, which are provided with suction-restricted radial piston pumps, the hydraulic system includes a orifice arranged, as shown, in the direction of flow, downstream of the cooler and on the secondary side of the variator, in the line between the cooler and oil sump.

The orifice cross-section can be controlled between a first position, in which it is closed, and a second position, in which it is completely open, as a function of the rotational speed of the drive motor of the vehicle and of the vehicle traveling speed. The orifice is configured in such a manner that it does not begin to open the passage until a predetermined traveling speed is reached. If, at full load operation and maximum speed, the variator is operated at a single operating point, namely the top transmission ratio, then a highly dynamic adjustment of the variator will no longer take place and the amount of oil flowing through the cooler will be increased by the fact that, from a certain traveling speed, the orifice will permit the drainage of oil into the oil sump. The orifice opens from this traveling speed on to a higher traveling speed as a function of the increasing rotational speed until the orifice is completely open.

For example, in a transmission of a motor vehicle, it is expedient, or required, for the transmission oil to be within a certain temperature range. In order to fulfill the requirement, at least one heat exchanger is provided for cooling or for heating the transmission oil. The oil flows through the heat exchanger at one side thereof, and a secondary flow medium (liquid or gas as coolant), flows through the other side. As a result, the secondary flow medium can absorb heat from the transmission oil or deliver heat to the transmission oil. The heat transfer in the heat exchanger is dependent on a plurality of physical state variables. One important physical state variable for the heat transfer is the volume flow of transmission oil per unit time through the heat exchanger. With increasing volume flow of transmission oil, a higher heat transfer can take place within the heat exchanger.

It is the object of the present inventions to provide a predetermined desired flow of hydraulic operating medium, for example of transmission oil, through a heat exchanger as a function of certain parameters with only a small functional and structural outlay.

SUMMARY OF THE INVENTION

In a method for controlling the operating temperature of a hydraulic operating medium for a drive unit of a vehicle in a selected range, the operating temperature is controlled by controlling the volume flow of the operating medium for a heat exchange between the operating medium and a secondary heat transfer medium flow medium to a predetermined desired value as a function of the actual value of the operating temperature and as a function of at least one other vehicle parameter, by which a certain temperature-influencing effect on the operating medium can be provided. The selected range of the operating temperature includes both the temperature values occurring in the warm-up phase of the drive unit and temperature values, which are substantially higher than the desired value.

With the method according to the invention, the control of the volume flow per unit time of the operating medium for the heat exchanger is simplified because it is no longer necessary to take into consideration three operating states for the control valve and also two heat exchange devices operating in different temperature ranges, such as a cooling device and a heating device.

In the method according to the invention, the volume flow per unit time of operating medium for the heat exchange for controlling the operating temperature can be varied by branching off a partial amount of the volume flow per unit time either upstream of a heat exchanger, and consequently supporting the heat exchange for this partial amount, or, if a special second heat exchanger is used for this partial amount, suppressing the heat exchange in this second heat exchanger by cutting off the associated secondary flow medium.

For achieving the desired operating temperature it is furthermore advantageous, if the same secondary flow medium is used for the heat exchange during the warm-up phase and when the temperature is above the desired value.

In order to be able to take into consideration, by way of feedback, the transmission oil temperature present at any given moment in one embodiment the operating temperature is controlled to a predetermined desired value by feedback control.

With the method according to the invention, the desired value is reached relatively rapidly, if the control is based on the temperature gradient of the oil or on the difference between the oil and the secondary fluid in the heat exchanger.

In order for the control method according to the invention, to avoid—if the cooling water of an internal combustion engine is used for the secondary flow medium—the withdrawal of too much heat from the internal combustion engine during cold start for heating up the operating medium of the drive unit, that is, for example of the transmission oil, the flow of operating medium in the heat exchanger may be maximized if the operating temperature of the operating medium is lower than the operating temperature of the secondary flow medium.

In order for the method to be able to take the operating temperature at a particular instant into consideration without feedback, the operating temperature is preferably set to a predetermined desired control value.

If, in the device for controlling the operating temperature of a hydraulic operating medium for a drive unit of a vehicle, the heat exchange can be managed merely with a single device, the second heat exchanger which, in the prior art is arranged in the bypass line and is intended for the mixed operation by means of the exchange of heat, may also be omitted.

If a device for controlling the operating temperature of a hydraulic operating medium for a drive unit of a vehicle is present, a connection to a collecting tank or to hydraulic consumers of the drive unit is preferably provided for draining the heat exchanger. The control value for controlling the operating temperature of a hydraulic operating medium for a drive unit of a vehicle is preferably a 3/2-way directional control valve irrespective of the control method or, it may be a flow-regulating valve.

If the device for controlling the operating temperature of the hydraulic operating medium for the drive unit of a vehicle includes an electronic control unit for carrying out control processes, such unit has an input for measured or determined actual values of the operating temperature and/or at least one input for measured or determined actual values of other vehicle parameters, and an output for a control signal, which is formed from the desired value and at least one of the actual values, for setting the operating temperature. The control valve is provided with an electromotive valve-actuating unit, which is connected to the output of the control unit and is intended for operating its valve actuator. The electromotive valve-actuating unit of the control valve may advantageously be an electromagnet.

With a device for controlling the operating temperature of a hydraulic operating medium for a drive unit of a vehicle where regulating processes are carried out, the electronic control unit and/or a sensor for actual values of the operating temperature may be arranged in a collecting tank for the operating medium.

Preferably the device for controlling the operating temperature of a hydraulic operating medium for a drive unit of a vehicle includes a valve actuator which can be actuated by a temperature-sensitive control element, which responds, by means of structural change and/or deformation, to temperature changes and is in heat-transmitting contact with the hydraulic operating medium. In this way, the outlay on control equipment is kept advantageously low because the control element is actuated exclusively by contact with the operating medium.

The temperature-sensitive control element for actuating the valve actuator of the control valve is preferably a memory metal or bimetal spring or an expansion element.

The valve actuator is preferably an axially moveable control spool.

For the pressure supply of the drive unit, a supply line extends between the control valve and a feed pump and includes a pressure-regulating valve.

Various embodiments of the invention will be described in greater detail below with reference to the accompanying drawings.

DESCRIPTION OF PREFERRED EMBODIMENTS

Figure 1:
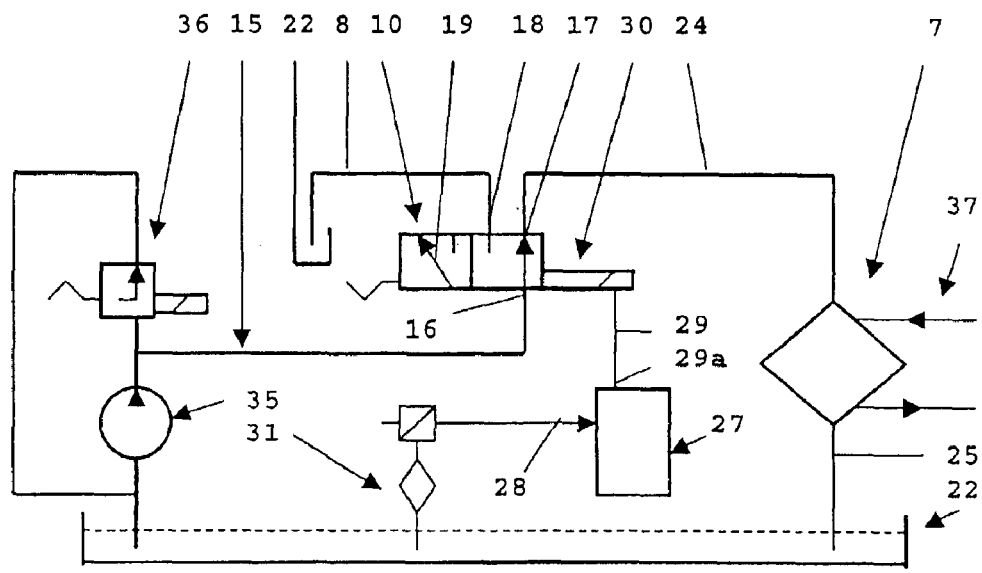
FIG. 1 is a block circuit diagram of a first embodiment of the device of the invention for controlling the operating temperature of the transmission oil of a vehicle.
Figure 2:
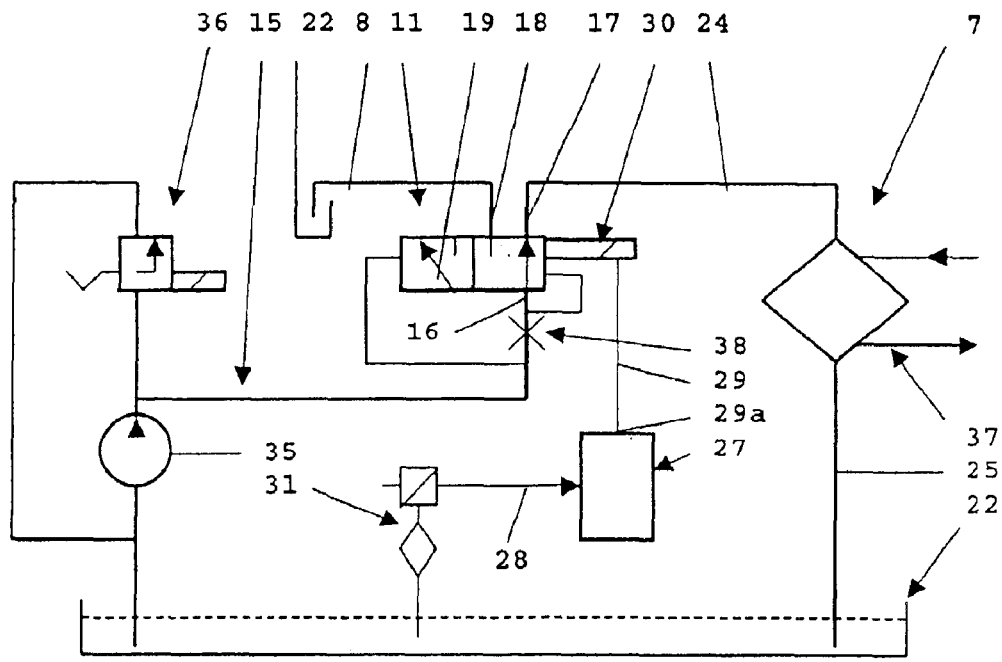
FIG. 2 is a block circuit diagram of a second embodiment of the device of the invention for setting the operating temperature of the transmission oil of a vehicle.
Figure 3:
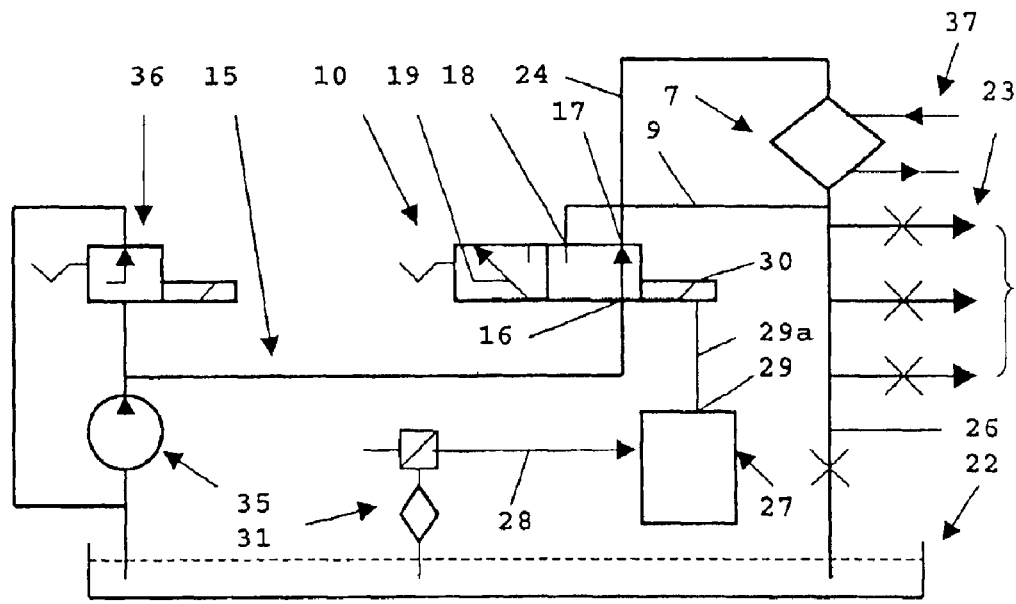
FIG. 3 is a block circuit diagram of a third embodiment of the device of the invention for controlling the operating temperature of the transmission oil of a vehicle, FIG. 4 indicates a first embodiment of a control valve of a device according to the invention for controlling the operating temperature of the transmission oil of a vehicle, FIG. 5 indicates a second embodiment of a control valve of a device according to the invention for controlling the operating temperature of the transmission of a vehicle, and FIG. 6 indicates a third embodiment of a control valve of a device according to the invention for controlling the operating temperature of the transmission oil of a vehicle.

With reference to FIGS. 1 to 3, a hydraulic operating medium, such as lubricating oil or transmission oil, is sucked out of a collecting tank 22 of a drive unit, for example a transmission, by means of a feed pump 35 for the purpose of supplying lubricating points and, if appropriate, unit components together with their controlling elements and actuators. The oil is fed into a supply line 15, which leads to a valve connection 16 of a control valve 10 (FIGS. 1, 3) and 11 (FIG. 2) and to a pressure-regulating valve 36. The control valve 10 or 11 has a second valve connection 17, which is connected to a heat exchanger 7 by an inlet line 24, and a third valve connection 18.

For the heat exchange between the transmission oil and a secondary flow medium used as heat transfer medium, for example the coolant of an internal combustion engine of the drive unit, the heat exchanger 7 is connected to a secondary circuit line 37. For the drainage of the transmission oil, the heat exchanger is connected to an outlet line 25 (FIGS. 1, 2) and 26 (FIG. 3), the outlet line 25 leading back into the collecting tank 22 and the outlet line 26 leading to hydraulic consumers, for example lubricating points 23.

The respective valve connection 18 of the control valve 10 in FIG. 1 and of the control valve 11 in FIG. 2 is connected to the collecting tank 22 by a bypass line 8. In contrast, the valve connection 18 of the control valve 10 in FIG. 3 is connected to the outlet line 26 of the heat exchanger 7 by a bypass line 9.

An electronic control unit 27 for an automatic transmission and a sensor 31, which is connected to an input 28 of the control unit 27 and is intended for measuring the actual operating temperature of the transmission oil, are accommodated in the collecting tank 22. The control unit 27, which may have further inputs for measured or otherwise determined actual values of other vehicle parameters, whose influence on the operating temperature of the transmission oil can be foreseen, is provided with an output 29 for a control signal, which has been formed from a predetermined desired value for the operating temperature of the transmission oil and at least one of the actual values with the assistance of a stored algorithm.

The output 29 is connected via an electric line 29a to an electromotive valve actuating unit in the form of an electromagnet 30 for actuating the valve actuator 19 of the control valve 10 or 11. The valve actuator 19, which is arranged moveably in the valve block of the respective control valve, serves for the controlled connection of at least two, or all three, of the valve connections 16 to 18.

While a respective 3/2-way directional control valve can be used for the control valves 10 (FIGS. 1, 3), the control valve 11 is designed as a flow-regulating valve with a measuring orifice 38, which is connected upstream and whose pressure difference is utilized as a control variable for actuating the associated valve actuator 19.

In all three embodiments of the device according to the invention as shown in FIGS. 1 to 3, the transmission oil temperature is measured by means of the sensor 31. It is appropriate to use a location for measuring the temperature where the greatest heating occurs. The temperature measuring location may also be selected in such a manner that temperature-sensitive components, such as the electronic control unit 27, are situated as close as possible to the measuring point. Accordingly, the control unit 27 and sensor 31 are arranged in the oil sump.

The measured temperature signal is passed on to the electronic control unit 27 in short time intervals or continuously. As a function of the temperature level at a particular instance and as a function of the temperature gradient at a particular instance of the transmission oil, the control unit 27 determines a required, electrical control signal which is passed on to the relevant control valve 10 or 11. Finally, the control signal is used to set a change or a new target value of the volume flow of the transmission oil through the heat exchanger 7. Various regulating or control strategies are conceivable for determining the change in volume flow or the new target value in the control unit 27.

Instead of the transmission oil temperature, signals of other or further measured vehicle parameters may also be used for the influencing—regulating or controlling—of the volume flow of oil through the heat exchanger 7. Suitable vehicle parameters are, for example, accelerator pedal travel, torque, rotational speed, converter slip, operating time or further temperatures (such as, for example, the coolant temperature). It is conceivable for various signals to be linked by computer in such a way that also new variables can be generated. Finally, a suitable computer model can be established by the use of different signals, in order to regulate or to control the volume flow of oil through the heat exchanger 7.

In the devices of FIGS. 1 to 3, a customary pressure supply is provided by a feed pump 35 and a pressure-regulating valve 36. However, the precise design of the pressure supply in the transmission is not of significance for the regulation or control of the volume flow of oil via the heat exchanger 7.

In the devices of FIGS. 1 and 2, the volume flow of oil via the heat exchanger 7 is controlled or regulated with the assistance of the relevant control valve 10 or 11. Depending on the position of the control valve 10 or 11, the volume flow of oil is divided into two partial oil amounts supplied to the heat exchanger 7 and the oil sump. It would also be conceivable to use a control valve 10 in the form of shut off valve whereby the volume flow of oil to the heat exchanger 7 is unrestricted in one valve position but is blocked in the other valve position. In the arrangements as shown in FIGS. 1 and 3, the control valve 10 is a directional control valve, which can be switched between two valve positions as a function of the control signal. The supply line 15 is connected in the valve position shown (biased into a rest position by spring force) to the heat exchanger 7 but is connected to the bypass line 8 or 9 in the other valve position.

In the arrangement as shown in FIG. 2, the control valve 11 is a flow-control valve, which establishes a controlled volume flow to the heat exchanger 7. For this purpose, the pressure difference of the measuring orifice 38 is utilized as a measure for the actual volume flow of the oil by the connection to the valve actuator 19.

In the arrangement as shown in FIG. 3, transmission lubrication lines 23 are arranged downstream of the heat exchanger 7. Depending on the position of the control valve 10, the volume flow of oil is directed to the heat exchanger 7 or directly to the transmission lubrication lines 23.

During the warming-up phase of the transmission, it is advantageous in accordance with the method of the invention to shut off initially the volume flow of oil to the heat exchanger 7. In this way, a more rapid heating of the transmission oil is achieved by the internal transmission friction losses. Because of the dependence of the efficiency of the transmission on the temperature, the efficiency can be improved by shutting off the flow of oil at low temperatures. Since the transmission is then heated faster, the fuel consumption of a motor vehicle can be reduced.

If it is not desired to control the volume flow, but rather only to switch on or switch off the flow of oil through the heat exchanger 7, then it is expedient to use for this purpose a pure directional control valve having only two valve positions.

If an operating state is present, in which a particular temperature drop between the secondary flow medium and the transmission oil occurs in the heat exchanger 7, it is advantageous in the warm-up phase of the transmission to increase the volume flow of the oil to the heat exchanger 7 to an optimum. As a result, a more rapid heating of the transmission oil is likewise achieved.

Figure 4:
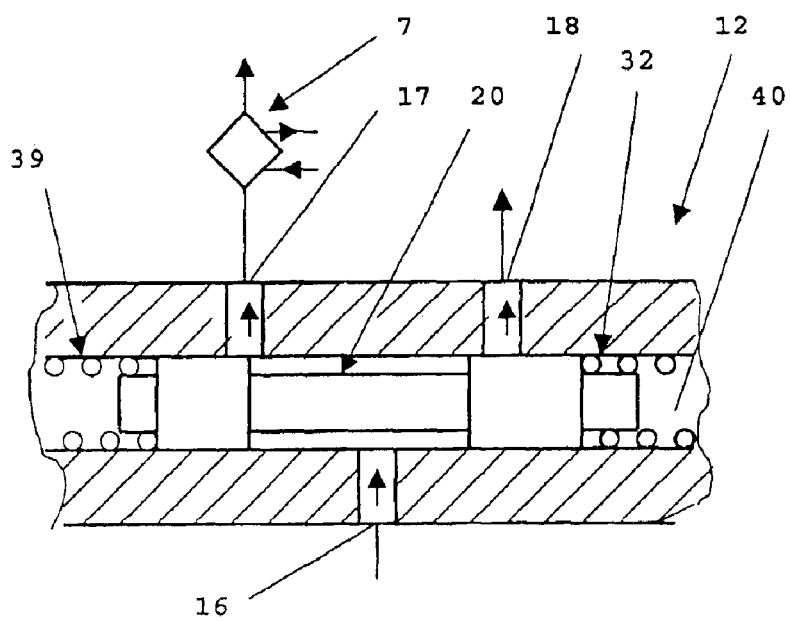
Figure 5:
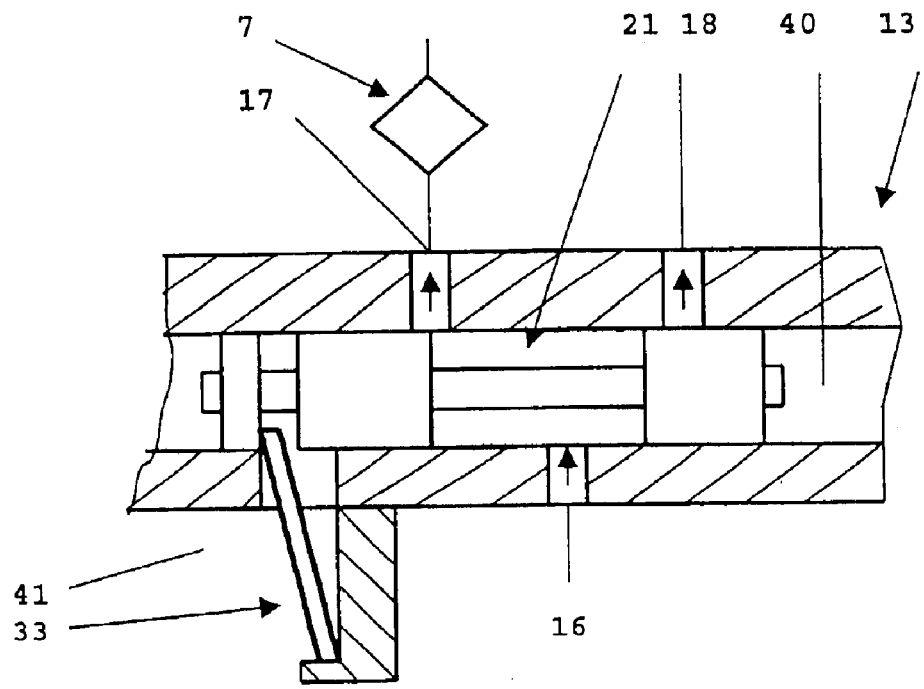
Figure 6:
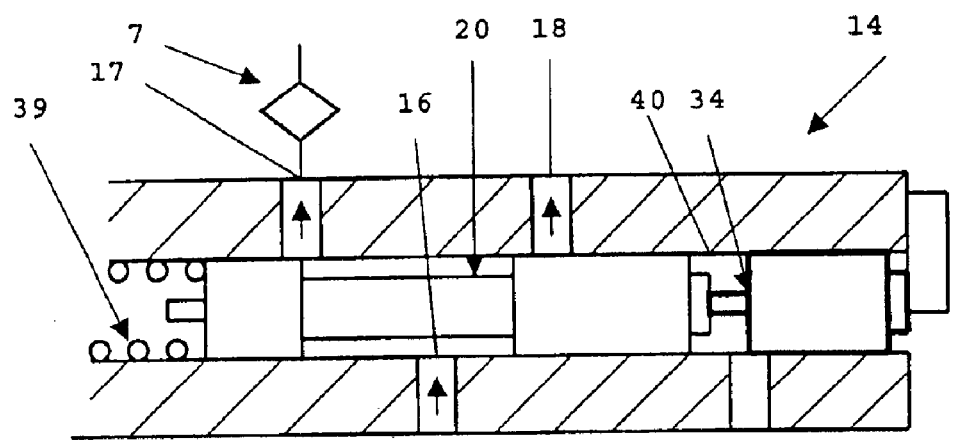

For an understanding of the designs of the control valves of FIGS. 4 to 6, a device according to FIG. 3 is first described. In this device, the control valve 10, the control unit 27 and the temperature sensor 31 are replaced by the respective control valve 12 or respectively, 13, or 14. Accordingly, in the respective control valves 12 or 13 or 14, the valve connection 16 extends to the supply line 15 and the valve connection 17 extends to the heat exchanger 7 and the valve connection 18 extends to the bypass line 9.

The control valves 12 and 14 are spool valves including each an axially moveable control slide or spool 20 (FIGS. 4, 6), which is biased by a load spring 39 arranged at one end of the spool into one end position (inoperative position) in which the supply line 15 is connected to the bypass line 9 leading directly to the transmission lubrication, and wherein the valve connection 17 to the cooler 7 is shut off.

When a certain temperature level is reached in the collecting tank 22, the spool 20 of the control valve 12 can be moved into its indicated other end position by a memory spring 32, which is accommodated in a valve chamber 40, which communicates with the collecting tank 22 and is bounded by the other end of the spool 20. In this other end position of the spool 20, the supply line 15 is connected to the transmission lubrication lines 23 via the cooler 7.

In the arrangement as shown in FIG. 5, when a certain temperature level is reached in the collecting tank 22, the spool 20 of the control valve 14 is moved to its other end position by an expandable element 34 which is accommodated in a valve chamber 40, which communicates with the collecting tank 22 and is bounded by the other end of the spool 20.

In the arrangement as shown in FIG. 5, the control slide 21 of the control valve 13 can be moved between its one end position (inoperative position), in which the supply line 15 is connected directly to the transmission lubrication 23 via the bypass line, and its other end position, in which the supply line 15 is connected to the transmission lubrication 23 by the cooler 7, by a bimetal spring 33, which is arranged in a valve chamber 41 communicating with the collecting tank 22 and which extends, in an articulated manner, into a circumferential groove of the control slide 21. The groove is provided near the one end of the control slide 21. At the other end of the control slide 21, there is a valve chamber 40, which likewise communicates with the collecting tank 22. The switching-over function of the bimetal spring 33 is coordinated with the reaching of a certain temperature level in the collecting tank 22.

The temperature level for the switching over of the respective control valve 12 or 13 or 14 is based on the warmup phase of the transmission in such a manner that the heat exchanger 7 is switched off in the warmup phase.

What is claimed is:

1. A method of controlling the operating temperature of a hydraulic operating medium of a drive unit of a vehicle, said method comprising the steps of controlling the operating temperature of the hydraulic operating medium by controlling, in a warm-up phase of the drive unit, the volume flow per unit time of the operating medium in heat exchange with a secondary flow medium, which is used as heat transfer medium, as a function of the operating temperature of the hydraulic operating medium and the secondary flow medium in such a manner that the flow of the hydraulic operating medium, which is subjected to heat exchange, is set to zero, as long as the temperature of the hydraulic operating medium is higher than the temperature of the secondary flow medium, and is set toward a maximum—when the temperature of the hydraulic operating medium is lower than the temperature of the secondary flow medium.

2. A method according to claim 1, wherein the setting of the operating temperature to a predetermined desired value takes place under temporary suppression of the heat exchange for a variable partial amount of the volume flow of the operating medium.

3. A method according to claim 2, wherein the same secondary flow medium is used for the heat exchange during the warmup phase of the drive unit and at operating temperatures above the desired value.

4. A method according to claim 1, wherein the setting of the operating temperature to a predetermined desired value is accomplished by automatic temperature control means.

5. A method according to claim 4, wherein the operating temperature is controlled to a predetermined desired value additionally as a function of the gradient of the operating temperature of the operating medium.

6. A method according to claim 1, wherein the volume flow of the operating medium, which flow is subjected to the heat exchange, is set to a maximum—if the operating temperature of the operating medium is smaller than a minimum value of the operating temperature of the secondary flow medium.

7. A method according to claim 6, wherein the minimum value of the operating temperature of the secondary flow medium lies in the temperature range of between 60° C. and 110° C.

8. A device for controlling the operating temperature of a hydraulic operating medium for a drive unit of a vehicle including a heat exchanger for adjusting the operating temperature of the hydraulic operating medium, a control valve for controlling the volume flow per unit time of the hydraulic operating medium through the heat exchanger for heat exchange between the hydraulic operating medium and a secondary flow medium to a predetermined desired value as a function of at least one of the operating temperature and another vehicle parameter, a bypass line bypassing the heat exchanger said control valve having a valve housing with a first valve connection connected to an operating medium supply line, a second valve connection connected to said heat exchanger, and a third valve connection connected to said bypass line, a valve actuator arranged moveably in the valve housing for establishing selectively communication between said first valve connection and said heat exchanger on one hand, and a bypass line leading directly to a collecting tank of the drive unit, on the other hand, said valve actuator including a temperature sensitive control element for switching the valve during the startup phase of the motor vehicle such that the hydraulic operating fluid is directed through the line bypassing the heat exchanger when the temperature of the secondary fluid in the heat exchanger is lower than the temperature of the hydraulic operating fluid or higher by only a predetermined amount but directs the hydraulic operating fluid through the heat exchanger for heat exchange with the secondary fluid when the temperature of the secondary fluid exceeds the temperature of the hydraulic operating fluid in order to raise the temperature of the hydraulic operating fluid during the startup phase as rapidly as possible.

9. A device according to claim 8, wherein said heat exchanger is connected to said second valve connection of said control valve by an inlet line for said operating medium, said heat exchanger having an outlet line for said operating medium providing for a direct connection between one of the heat exchanger, a collecting tank for the hydraulic operating medium and hydraulic medium consumers of the drive unit.

10. A device according to claim 8, wherein said control valve is a three-two-way directional control valve.

11. A device according to claim 8, wherein said control valve is a flow volume control valve.

12. A device according to claim 8 including an electronic control unit which has at least one input for actual values of the operating temperature and inputs for actual values of other vehicle parameters, and an output for a control signal, which is formed from a desired value and at least one of the actual values for setting the operating temperature, and in which said control valve is provided with an electromotive valve actuating unit, which is connected to said output for operating an actuator of said valve, said electromotive valve actuating unit of said control valve being an electromagnet.

13. A device according to claim 12, wherein at least one of a temperature sensor for measuring the actual value of the operating temperature of the operating medium and the electronic control unit is arranged in a collecting tank for the operating medium.

14. A device according to claim 8, wherein the temperature-sensitive control element is a shape memory spring.

15. A device according to claim 8, wherein the temperature-sensitive control element is a bimetal spring.

16. A device according to claim 8, wherein the temperature-sensitive control element is an expansion element.

17. A device according to claim 8, wherein said valve is a spool valve and said valve actuator of said control valve is an axially movable control slide.

18. A device according to claim 8, wherein said supply line for the operating medium is connected to a feed pump and a pressure regulating valve.

* * * * *